UNITED STATES PATENT OFFICE.

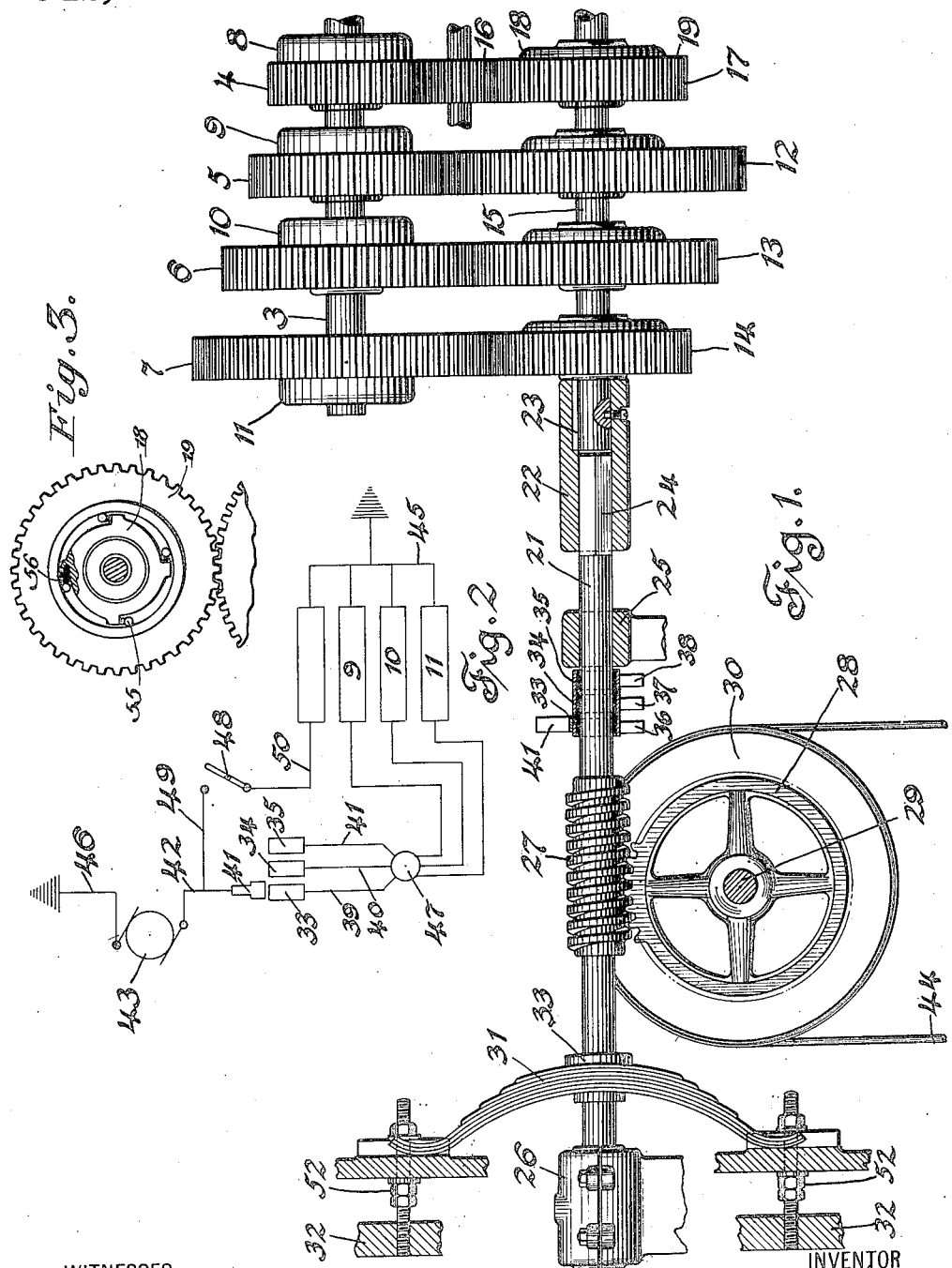

EMIL E. KELLER, OF PITTSBURG, PENNSYLVANIA.

POWER-TRANSMISSION MECHANISM.

942,913. Specification of Letters Patent. Patented Dec. 14, 1909.

Application filed December 13, 1905, Serial No. 291,512. Renewed August 24, 1909. Serial No. 514,451.

*To all whom it may concern:*

Be it known that I, EMIL E. KELLER, a citizen of the United States, and a resident of Pittsburg, in the county of Allegheny and State of Pennsylvania, have invented a new and useful Improvement in Power-Transmission Mechanisms, of which the following is a specification.

This invention relates to power transmission mechanisms.

In transmission mechanisms in which the power developed by an engine or motor is transmitted to a machine through gears, pulleys or friction disks, it often becomes necessary to increase the torque or purchase of the engine or motor at a sacrifice of speed of the machine or the time in which work is done. Such variations of purchase and changes of speed are accomplished in various ways, such for instance as providing the power transmission mechanism with ordinary change speed gears which are thrown into and out of operation, thereby varying the torque or purchase of the transmission mechanism as the resistance encountered seems to demand.

The object of this invention is the production of means for automatically varying the torque or purchase of the power transmission mechanism in accordance with the resistance or load encountered.

Throughout the following description I have considered my invention as applied to the power transmission mechanism of a hoisting engine or crane, without any idea of limiting its application to such machines, as it will be readily apparent, to those skilled in the art, that it is equally applicable to the transmission mechanism of motor cars, locomotives and many other vehicles or machines.

In the single sheet of drawings accompanying this application and forming a part thereof, Figure 1 is an elevation of a hoisting mechanism of the crane embodying this invention. Fig. 2 is a wiring diagram illustrating the electrical connections utilized in carrying out my invention. Fig. 3 is a partial section of an overrunning device included in the apparatus embodying my invention.

The automatic operation of the transmission mechanism broadly consists in varying the length of the load arm of the transmission mechanism in accordance with the load or resistance encountered; by carrying out the analogy of the speed change device to the simple lever it is apparent that by varying the load arm of the lever, or by throwing into operation the different speed gears of the transmission mechanism in accordance with the variations of load or resistance encountered, the bending moment of the lever or the torsional moment of the transmission mechanism may be kept practically constant and consequently the load of the engine or motor may be kept constant within close limits.

The transmission mechanism illustrated comprises a power shaft 3 which receives power from a motor or engine, not shown, and is provided with rotatably mounted gears 4, 5, 6, and 7 which are respectively provided with electrically operated clutch devices 8, 9, 10 and 11 adapted to rigidly connect the respective gears to the shaft 3. The gears 5, 6, and 7 respectively mesh with gears 12, 13, and 14 mounted on the shaft 15 which is provided with suitable bearings, not shown, and the gear 4 meshes with a suitably mounted gear 16 which meshes with a gear 17 mounted on the shaft 15. The gears 12, 13, 14 and 17 each consist of a hub portion 18 rigidly mounted on the shaft 15 and a rotatably mounted rim portion 19 between which and the hub portion a pawl and ratchet or overrunning device is provided. The overrunning device comprises the hub portion 18, which is rigidly mounted on the shaft 15, the rotatable portion 19 and the clutch rollers 55, which are mounted in recesses formed in the peripheral face of the hub portion and which are held in contact with the inner peripheral face of the rim by springs 56. The shaft 15 drives a shaft 21 through a sleeve coupling 22 which consists of a sleeve 23 keyed or otherwise rigidly mounted on the shaft 15 and provided at one end with a squared opening into which a squared end 24 of the shaft 21 fits. The shaft 21 is so journaled in bearings 25 and 26 that it is capable of longitudinal motion relative to the sleeve 23. A worm 27 rigidly mounted on the shaft 21 meshes with and drives a worm wheel 28 rigidly mounted on a shaft 29 on which a lifting drum 30 of the power transmission mechanism is rigidly mounted.

A spring 31 is mounted between suitable supports 32 and collars 33 of the shaft 21 and is arranged to resist the longitudinal thrust of the shaft 21 occasioned by a pull or a resistance to motion of the drum 30 which is transmitted to the shaft 21 through the worm wheel 28 and the worm 27. Three insulated rings 33, 34, and 35 are mounted on the shaft 21 and are provided with suitable brushes 36, 37 and 38 which are respectively connected through wires 39, 40, and 41 to the operating mechanism of the clutches 11, 10 and 9 and are so arranged that they are thrown into or out of a clutch operating electric circuit by longitudinal reciprocations of the shaft 21 which are occasioned by the variations of resistance encountered and are rendered permissible by the spring 31. A brush 41 suitably mounted on the frame portion of the transmission mechanism and connected by a lead wire 42 to a source of electricity or generator 43 is adapted to contact with any one of the insulated rings 33, 34, and 35.

The spring 31 is designed to sustain with little or no distortion a longitudinal thrust of the shaft 21 caused by suspending a load on a cable 44 of the lifting drum 30 which the engine or motor can readily and efficiently lift while operating through the high speed gear train of the transmission mechanism. Greater loads will cause the spring to yield definite amounts proportional to the loads and consequently the shaft 21 will move longitudinally certain definite amounts proportional to the suspended loads. Under such conditions the insulated rings 33, 34, and 35 will, under an increasing load successively contact with the brush 41 and the high, intermediate and low speed gear trains will successively be thrown into operation.

The automatic operation of the device is as follows: Slight loads that the engine or motor can readily lift while operating through the high speed gears cause little or no distortion of the spring 31 and the brush 41 contacts with the ring 33, thereby completing the electric circuit from the generator 43 through the wire 42, the brush 41, the insulated ring 33, the wire 39, the operating mechanism of the clutch 11, a wire 45 and through the ground of the vehicle and the wire 46 back to the generator 43, thereby throwing the high speed clutch into operation. A load on the cable 44 which the engine or motor cannot raise while operating through the high speed gears causes the spring 31 to yield a definite amount and the shaft 21 in moving longitudinally moves the insulated ring 34 under the brush 41 thereby completing an electric circuit from the generator 43 through the wire 42, the brush 41, the ring 34, the wire 40 the operating mechanism of the clutch 10 the wire 45, the ground and the wire 46, thereby throwing the intermediate clutch 10 into operation. Loads that the engine or motor cannot lift while operating through the intermediate gear train causes the spring 31 to distort still farther thereby moving the ring 35 under the brush 41 and completing an electric circuit from the generator 43 through the wire 42, the brush 41, the ring 35, the wire 40 the operating mechanism of the speed clutch 9 the wire 45, the ground and the wire 46, thereby throwing the low speed clutch 9 into operation. The brush 41 is so designed that one of the insulated rings is always under it, and in passing from one to the next the arrangement is such that the operation of the clutches overlap each other which is rendered permissible by the overrunning devices with which the gears 12, 13 and 14 are provided.

In order that the motion of the transmission mechanism may be reversed without reversing the engine or motor I have introduced a reversing gear train which consists of the gears 4, 16 and 17 mounted as before described. In order that the reversing gear may be thrown into operation I have provided a switch 47 which will simultaneously break the metallic connections between the rings 33, 34 and 35 and their respective clutch operating devices and a reversing switch 48 which is arranged to connect the operating mechanism of the reversing clutch 8 with the generator 43 through the wire 42, a wire 49 and a wire 50. The switches 47 and 48 may be provided with an interlocking device which will render it impossible for both of the switches to be turned to the operating position at the same time.

The spring 31 is provided with suitable adjusting means 52 by which the automatic operation of the mechanism may be varied or adjusted.

It is apparent that the transmission mechanism as illustrated might readily be applied to a motor car, in which case, shaft 29 would drive through gears or otherwise the driving wheels of the car. Under such conditions the varying road resistances encountered would cause the spring 31 to yield definite amounts proportional to the resistance encountered and consequently the speed of the car would be varied in accordance with the resistance encountered and the load on the engine would be kept constant within close limits.

What I claim is:

1. In a power transmission mechanism, a plurality of power transmission gears, coöperating clutch devices, a load responsive device for controlling the operation of said clutches which comprises a driving member, a driven member, yielding means whereby said driven member is caused to move longitudinally in response to variations of load and means for rendering the motion of said driving member effective in controlling the operation of said clutches.

2. In a power transmission mechanism, a speed change device comprising a plurality of speed gears and coöperating clutch devices for controlling the operation of said gears, a load responsive device for controlling said clutch devices which comprises a driving part and a part to be driven therefrom, a yielding abutment for said driving part whereby said driven part is caused to move longitudinally in response to variations of load and means for rendering the longitudinal motion of said driving part effective in controlling the operation of said clutch devices.

3. In a power transmission mechanism, a driving part, a driven part, a plurality of sets of speed change gears between said parts, means for causing the driven part to occupy different longitudinal positions corresponding to different resistances encountered, and means for rendering the changes in position of said part effective in controlling the operation of said gears.

4. In a power transmission mechanism, a speed change device comprising a plurality of sets of speed change gears and means for controlling the operation of said gears, a power delivery agent, a rotatable driving member therefor located between said agent and said speed change device, a yielding abutment for said member whereby it is permitted to move to different positions corresponding to different resistances encountered by said agent and means for rendering the motion of said member effective in controlling the operation of gear controlling means.

5. A power transmitting mechanism comprising a plurality of sets of transmission gears and coöperating clutch devices, in combination with a worm, a worm wheel, means for causing said worm to move longitudinally in response to variations of load while transmitting power to said worm wheel, and means for rendering the longitudinal motion of said worm effective in controlling the operation of said transmission gears and clutch devices.

6. In a power transmitting mechanism, a plurality of sets of transmission gears and coöperating clutch devices, a driving member, a driven member, means, comprising a yielding abutment, for causing said driving member to move longitudinally while transmitting power in response to variations of load, and means for rendering the longitudinal motion of said member effective in controlling the operation of said gear and clutch devices whereby the effective turning moment of said power transmission mechanism is varied in accordance with the load encountered by said devices.

7. In a power transmission mechanism, a plurality of sets of power transmission gears, a driving member, a driven member, means, comprising a yielding abutment, for causing said driving member to move longitudinally in response to variations of load while transmitting power, and means for rendering the longitudinal motion of said member effective in controlling the operation of said transmission gears whereby the effective turning moment of said power transmission mechanism is varied in accordance with the load encountered by said driven member.

8. In combination in a power transmitting mechanism, a plurality of sets of transmission gears, a plurality of coöperating clutch devices, a driven member, a driving member between said transmission gears and said driven member and delivering power directly thereto, means for causing said driving member to move longitudinally in response to variations of load while transmitting power, and means, dependent on the motion of said member, for controlling the operation of said clutch devices whereby the effective turning moment of the power transmission mechanism is directly varied in accordance with the variations of load on said driven member.

9. In a power transmitting apparatus, a transmission mechanism comprising a plurality of independently operable clutch and gear devices, a driven member, a load responsive device comprising a rotatable member located between said mechanism and said driven member and capable of moving longitudinally while transmitting power, and means, dependent upon the longitudinal motion of said member, for controlling the operation of said clutch and gear devices.

10. In combination with a power shaft, a power transmitting mechanism comprising a plurality of sets of transmission gears, a driven member, a load responsive device comprising a rotatable member located between said mechanism and said driven member and delivering power directly thereto, and capable of longitudinal motion while transmitting power, and means, dependent upon the longitudinal motion of said member, for controlling the operation of said transmission gears whereby the effective turning moment of said power shaft is varied directly in accordance with variations of load encountered by said driven member.

11. In combination with a power shaft, a power transmitting mechanism comprising a plurality of sets of transmission gears, a driven member, a load responsive device comprising a rotatable member located between said mechanism and said driven member and capable of moving longitudinally in transmitting power, and means, dependent upon the longitudinal motion of said member, for controlling the operation of said transmission gears whereby the effective turning moment of said power shaft is varied directly in accordance with variations of load encountered by said driven member.

12. In combination with a power shaft, a power transmission mechanism comprising electrically operated clutch devices and co-operating gear trains, a driven member, a load responsive device comprising a rotatable member located between said mechanism and said driven member and capable of moving longitudinally while transmitting power, and means for rendering the longitudinal motion of said member effective in cutting into operation an operating circuit of one or another of said clutch devices.

13. In a power transmission mechanism, a driving part, a driven part, a plurality of sets of transmission gears for controlling the operation of said driving part, electrically operated clutch devices for controlling the operation of said gears, means comprising a yielding abutment for permitting said driving part to occupy different positions corresponding to different loads encountered by said driven part and means for rendering the longitudinal motion of said driving part effective in cutting into operation an operating circuit for one or another of said clutch devices.

14. In a power transmission mechanism, a turning moment varying device comprising a plurality of transmission gears and co-operating electrical operated clutch devices, a power delivery agent, a driving member between said agent and said device, means, comprising a yielding abutment, for causing said driving member to move longitudinally while transmitting power, and means, dependent upon the longitudinal motion, for cutting into an operating circuit to one or another of said clutch devices.

15. In a power transmission mechanism, a plurality of sets of transmission gears and electrically operated clutch devices controlling the operation of said gear sets, a load-responsive device for cutting one or another of said clutch devices into a clutch-operating circuit, said load-responsive device comprising a driving part, a driven part and a yielding abutment for said driven part whereby said driven part is caused to occupy different longitudinal positions for different loads encountered by said mechanism.

16. In combination with a speed change mechanism, a load responsive device for controlling the operation of said mechanism, comprising a driving part, a driven part, a yielding abutment for said driven part, whereby said driven part is caused to occupy different longitudinal positions for different loads encountered and electrical means for rendering the longitudinal motion of said driven part effective in controlling the operation of said speed change mechanism.

In testimony whereof, I have hereunto subscribed my name this twelfth day of December, 1905.

E. E. KELLER.

Witnesses:
DAVID WILLIAMS,
E. W. MCCALLISTER.